INVENTOR.
ERMAN V. CAVAGNERO
WILBUR L. SHEFFIELD
JOSEPH L. MORRO
BY
McCormick, Paulding & Huber
ATTORNEYS.

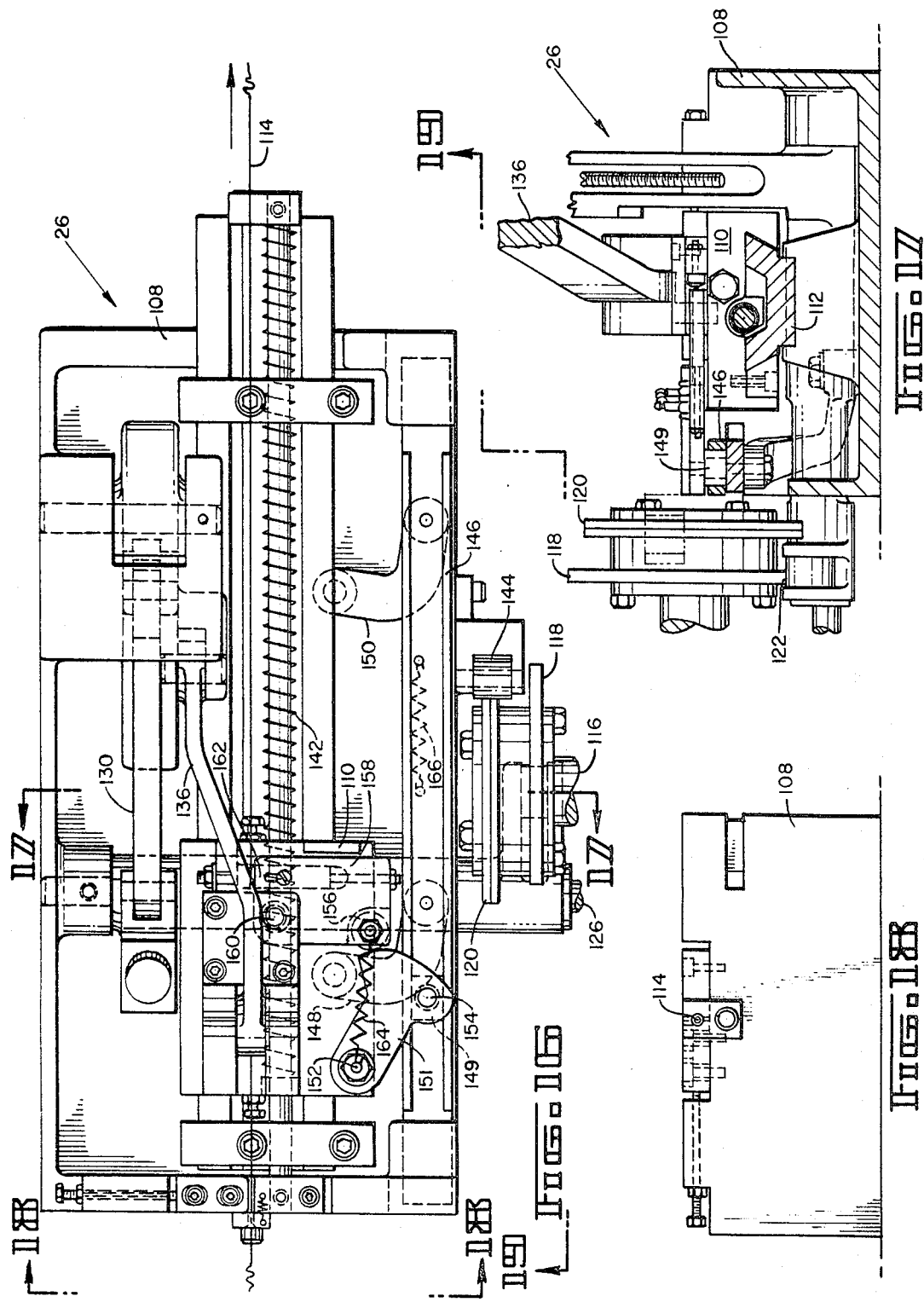

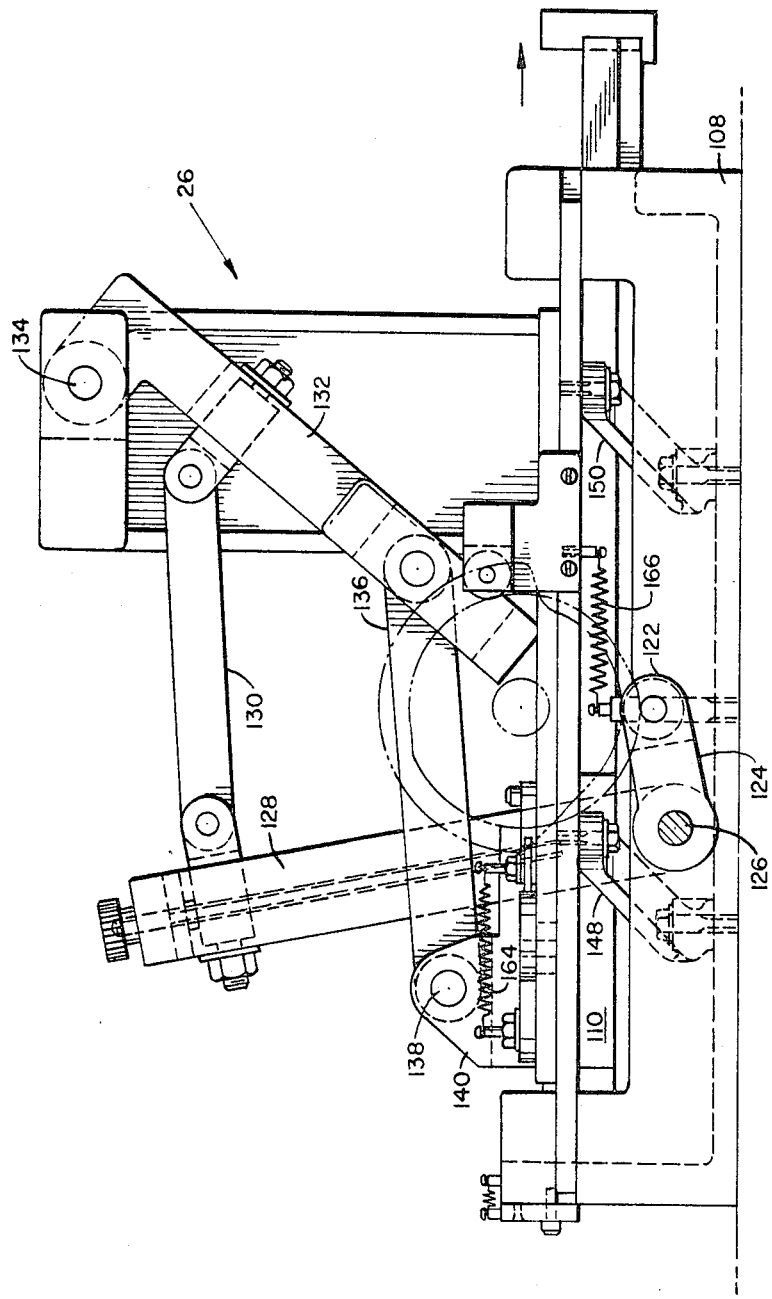

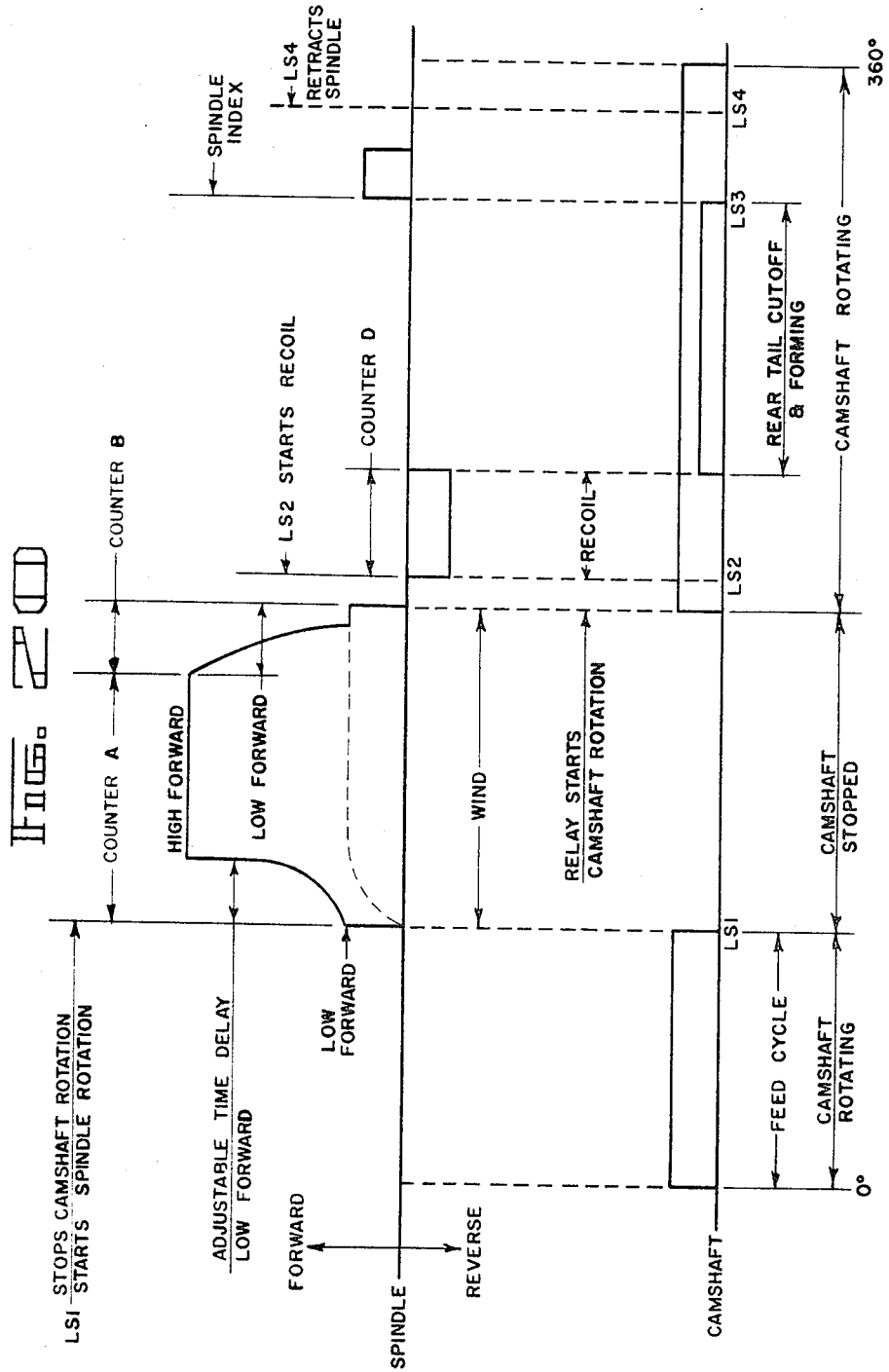

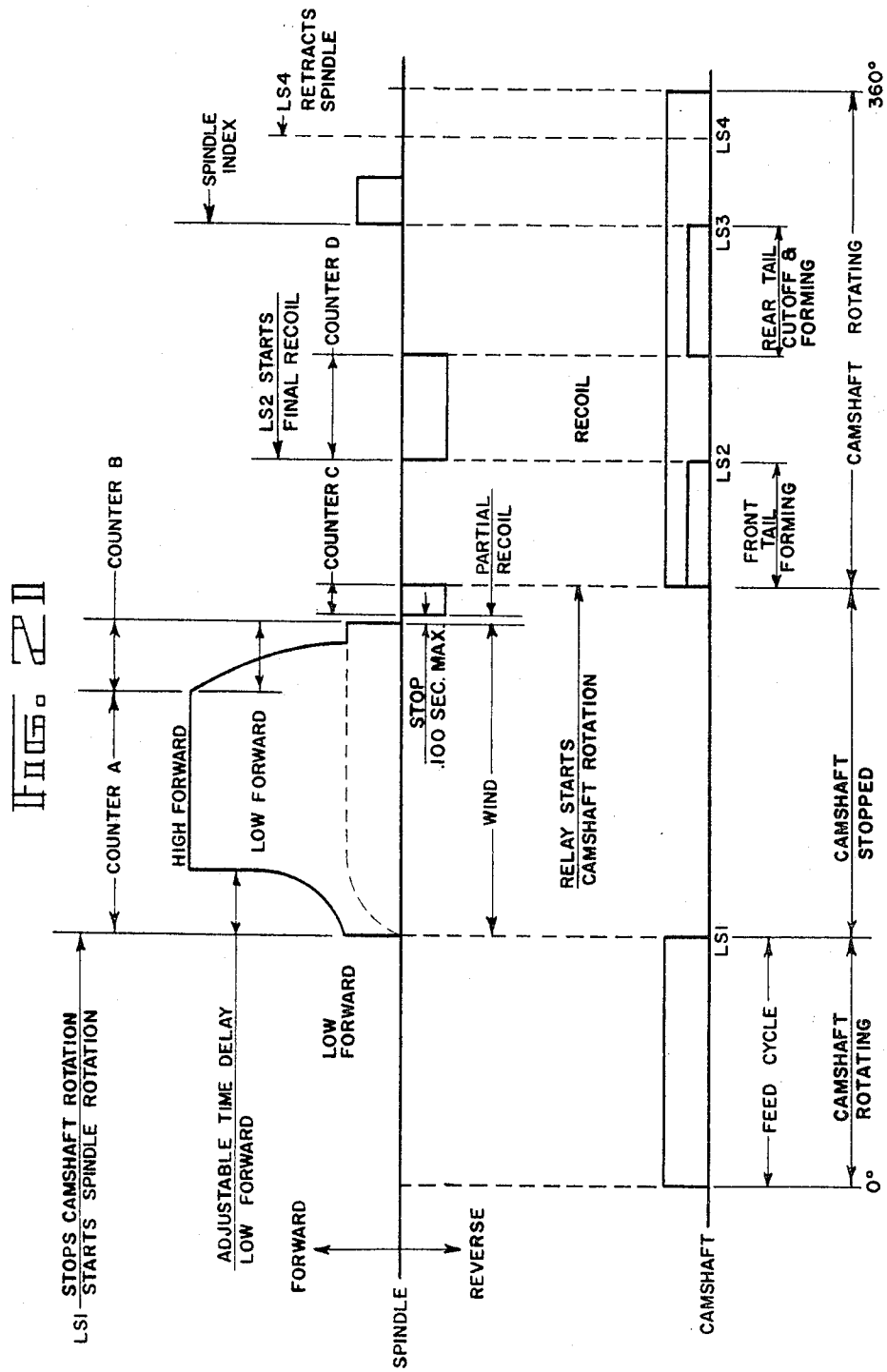

L.H. CONVENTIONAL

R.H. CONVENTIONAL

L.H END ACROSS CENTER COILING

R.H. END ACROSS CENTER COILING

United States Patent Office 3,433,041
Patented Mar. 18, 1969

3,433,041
SPRING WINDING MACHINE
Erman V. Cavagnero, Torrington, Conn., Wilbur L. Sheffield, Westwood, Mass., and Joseph L. Morro, Torrington, Conn., assignors to The Torrington Manufacturing Company, Torrington, Conn., a corporation of Connecticut
Filed Oct. 10, 1966, Ser. No. 585,337
U.S. Cl. 72—138  24 Claims
Int. Cl. B21f 3/10, 3/04

ABSTRACT OF THE DISCLOSURE

A highly versatile spring winding machine with feed mechanism and cams and camshafts for auxiliary mechanisms and with multidirectional rotatable and axially movable winding spindle. Feed and camshafts have clutch and brake drive and independent clutch and brake drive is provided for spindle so that former can be temporarily stopped during winding for conservation of cyclic operating time. Spindle drive includes adjustably inclined friction rollers for axial pitch inducing movement. A control unit comprising counters, pulse generator and associated circuitry provides precise slow-fast-slow winding, slow winding, and single and/or double stage recoil action.

---

This invention relates to a spring winding machine of the type which includes a rotatably driven spindle upon which springs of various types can be wound.

One object of the invention resides in the provision of a spring winding machine of the type mentioned which includes a winding spindle, a feed mechanism, and at least one auxiliary mechanism for operating upon end portions of springs and which employs a power operating means for the spindle, feed mechanism and auxiliary mechanism, the feed means including and being characterized by a fast response spindle drive means which is engageable and disengageable independently of the operation of the feed and auxiliary mechanisms, the winding machine thus being characterized by a high degree of ease and convenience in setup and a high degree of versatility in operation.

Another object of the invention resides in the provision of a spring winding machine of the type mentioned wherein the power operating means includes camshaft and cam means for operating the aforesaid feed and auxiliary mechanisms, the said camshaft and cam means being operable independently of drive means for the spindle such that the camshaft and cam means can be stopped in its operation during winding whereby to preserve camshaft rotation time for end forming operations.

Another object of the present invention resides in the provision of a spring winding machine of the type mentioned wherein first and second or high and low winding speeds are provided for, a high degree of accuracy in spring winding thus being achieved in high speed operation of the machine.

Another object of the present invention resides in the provision of a spring winding machine of the type mentioned wherein extensive control can be exercised over the recoil operations; that is, the precise amount of recoil required in a particular spring can be provided for in a simple and convenient set-up operation.

Still another object of the present invention resides in the provision of a spring winding machine of the type mentioned wherein first and second recoil operations are provided for; that is, a first recoil operation is provided for the desired positioning of an end portion of a spring for operation thereon by the auxiliary mechanism, and a second recoil operation is provided to complete the necessary number of turns of recoil.

A further object of the present invention resides in the provision of an improved axial feed or pitch drive means for the winding spindle, the said means providing an infinitely adjustable pitch control function and being independent of other set-up operations and adjustments to greatly facilitate coordination of various set-up operations.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 16 is an enlarged top view of a feed mechanism included in the winding machine of the present invention;

FIG. 17 is a vertical sectional view taken generally as indicated at 17—17 in FIG. 16;

FIG. 18 is an end view of the feed mechanism taken generally as indicated at 18—18 in FIG. 16;

FIG. 19 is a side elevational view of the feed mechanism taken generally as indicated at 19—19 in FIG. 16;

FIG. 20 is a diagrammatic illustration of a first mode of operation of the spring winding machine;

FIG. 21 is a diagrammatic illustration of a second mode of operation of the spring winding machine;

Figure 1:
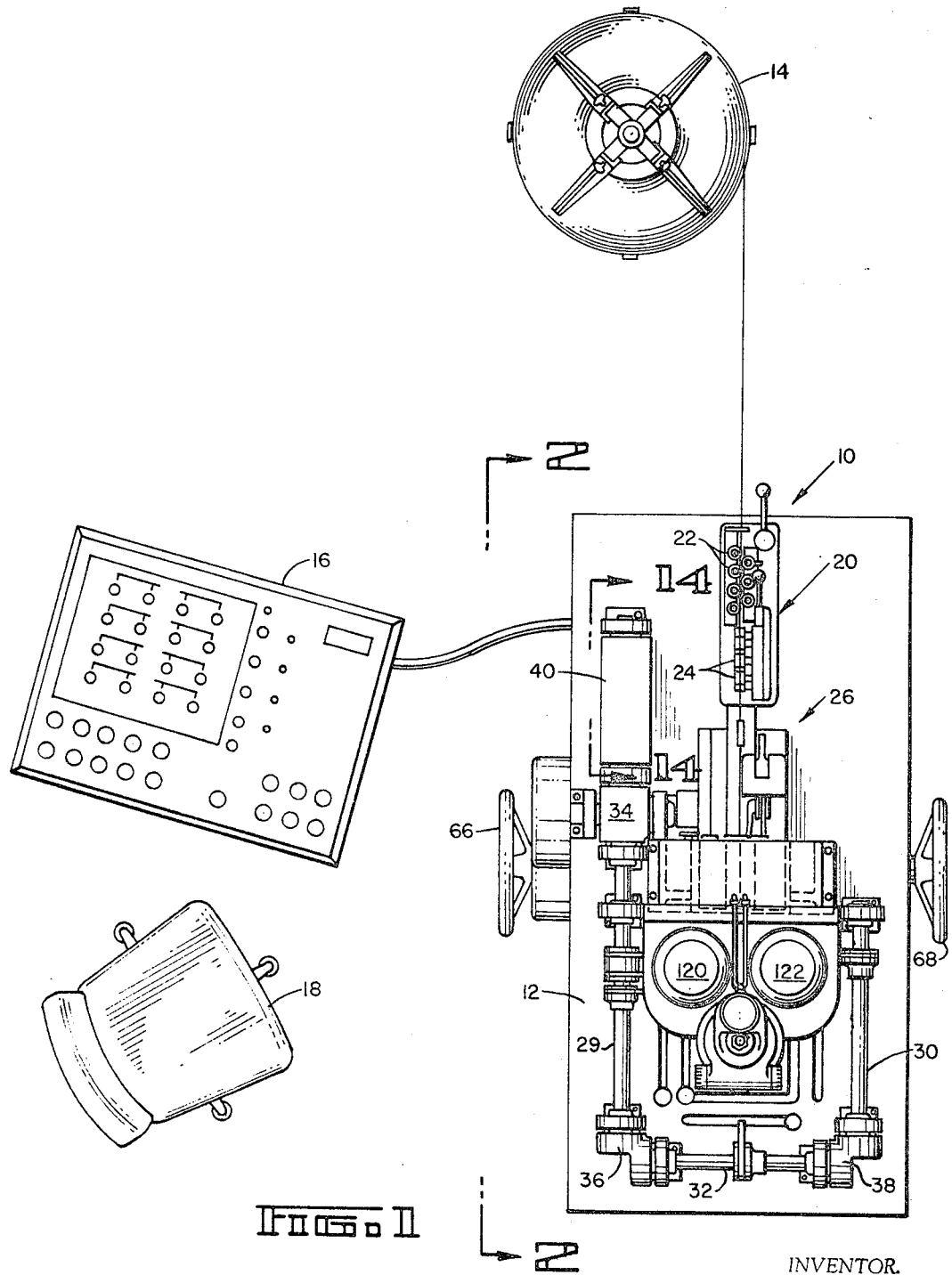
FIG. 1 is a top view of a spring winding machine constructed in accordance with the present invention.

Referring particularly to FIG. 1, it will be observed that a spring winding machine indicated generally at 10 provides a tablelike work area 12 on which various mechanisms are mounted for operating upon wire fed from a coil 14. A control console is preferably provided as indicated at 16 and an operator's chair may be provided as at 18. A wire straightener is indicated generally at 20 and may be conventional in form. A first series of straightening rolls 22, 22 cooperates with a second series of straightening rolls 24, 24 to straighten wire which is introduced from the straightener to a wire feed mechanism indicated generally at 26. From the feed mechanism 26, wire is advanced to a vertical wire winding spindle 28 where it is wound into springs in sequence and in a manner to be set forth in detail hereinbelow.

It should be noted that, while the spindle 28 is described above as "vertical" and other parts are referred to below as "vertical," "horizontal" etc. and directional in other respects, such directional terminology is employed for convenience of description only and is not to be taken in a limiting sense in the specification and the claims which follow.

Still referring to FIG. 1, it will be observed that left and right-hand horizontal camshafts are provided at 29 and 30 and that a front camshaft is provided at 32. The left-hand camshaft 29 is driven from appropriate bevel gears within a housing 34 and in turn drives the front camshaft 32 through a bevel gear connection at 36. The camshaft 32 in turn drives the camshaft 30 through a bevel gear connection 38. A limit switch assembly 40 is also driven from suitable gearing within the housing 34 as is the aforementioned feed mechanism 26. Auxiliary mechanism for working upon end portions of springs wound upon the spindle 28 may be operated from appropriate cams mounted upon the several camshafts 29, 30 and 32. Such mechanism may be conventional in form and need not be shown or described herein. Further, a guide means may be provided as indicated at 42 in FIG. 2 for wire advanced to the spindle 28 and cut-off and forming mechanism of conventional form may be provided adjacent the said guide means.

Figure 2:
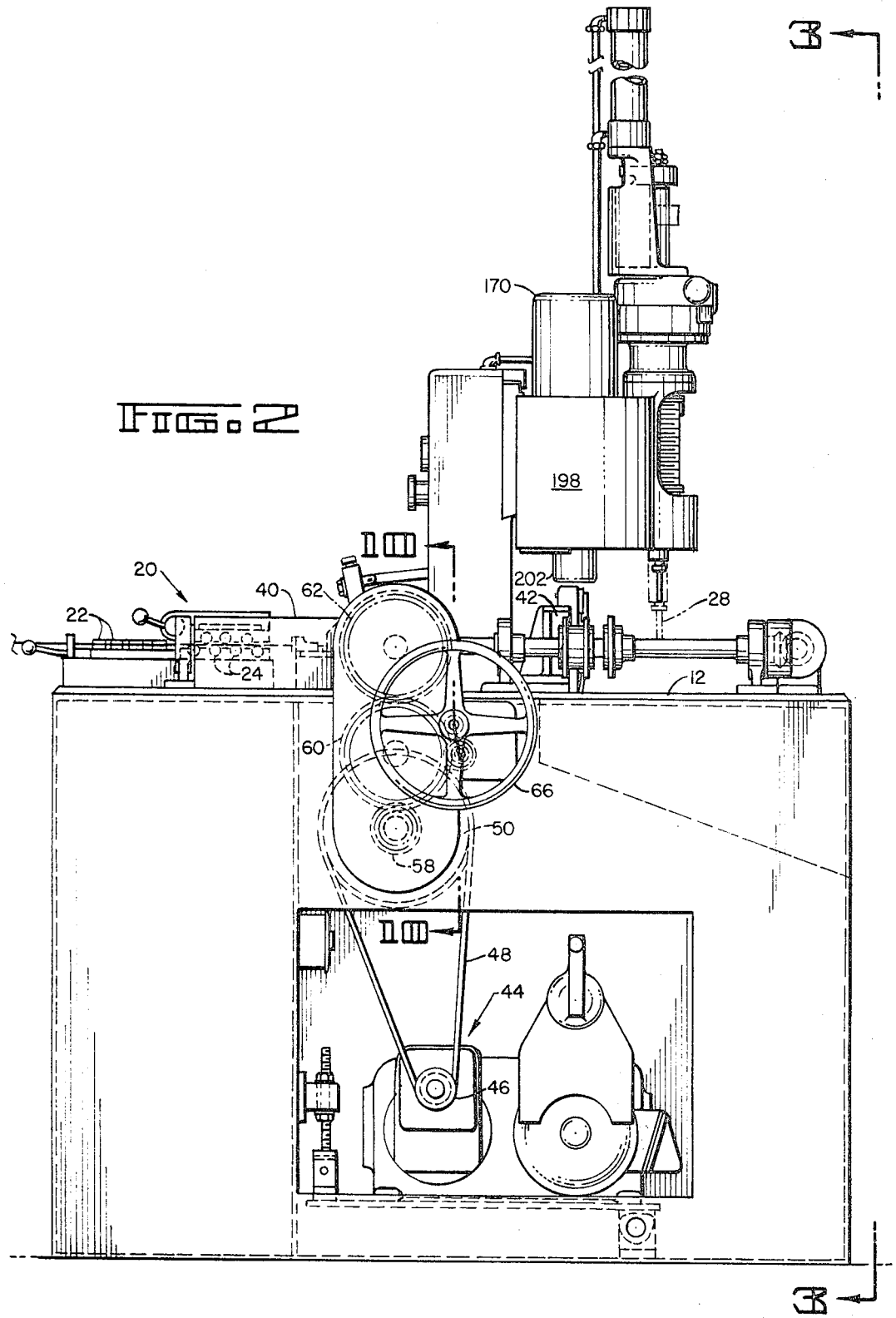
FIG. 2 is a left-hand side elevational view of the spring winding machine.
Figure 3:
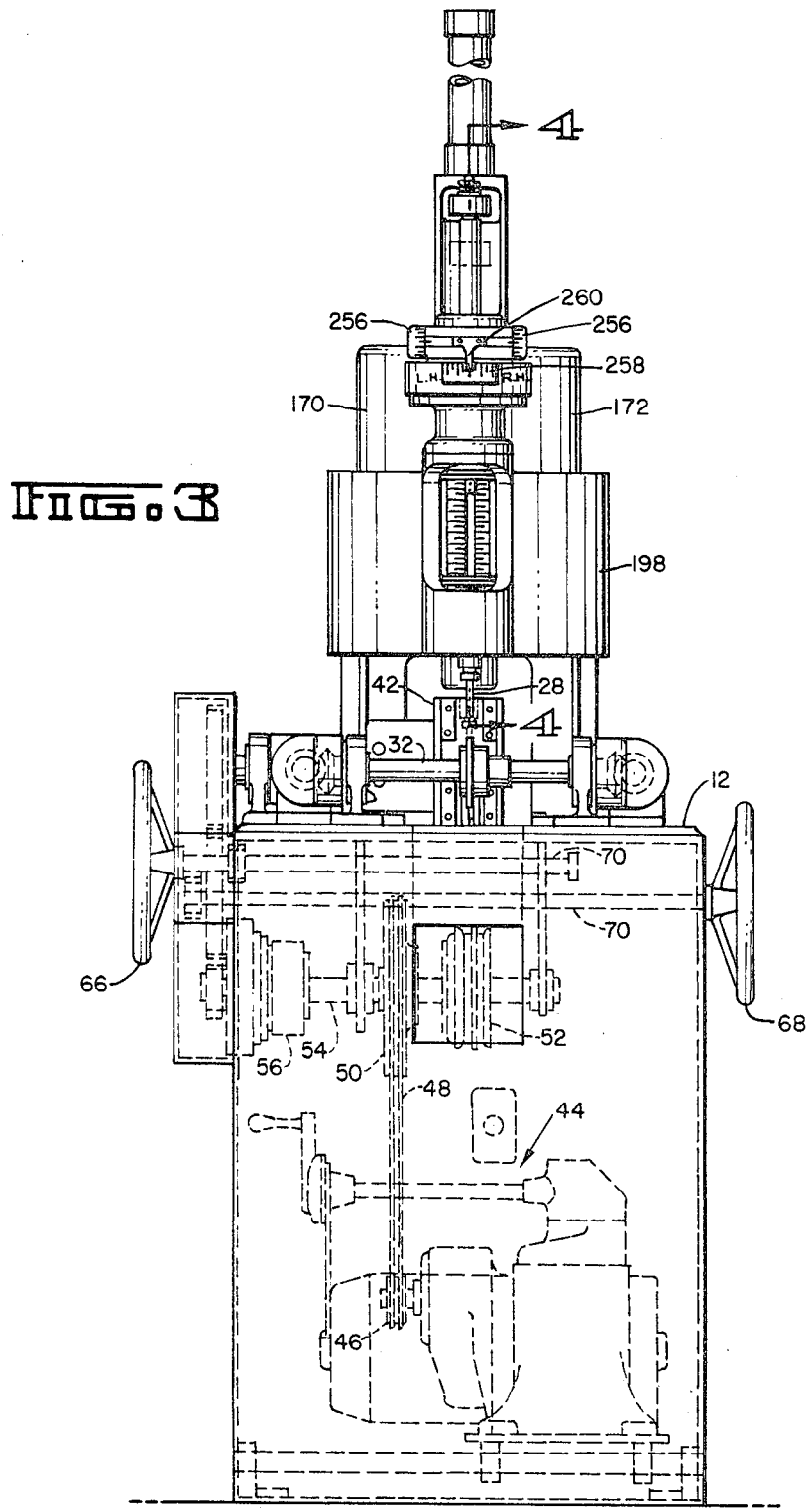
FIG. 3 is a front elevational view of the spring winding machine.

An electric motor and variable speed drive assembly is indicated generally at 44 in FIGS. 2 and 3 and includes an output pulley 46 adapted to drive a belt 48 which in turn drives a pulley 50. Pulley 50 in turn drives an electrically operable clutch 52, a clutch output shaft 54 and an electrically operable brake 56. The brake 56 in turn drives a gear 58, drivingly connected with a gear 60 and a gear 62 mounted on a shaft 64, FIG. 10, which in turn drives aforementioned bevel gears within the housing 34.

Figure 10:
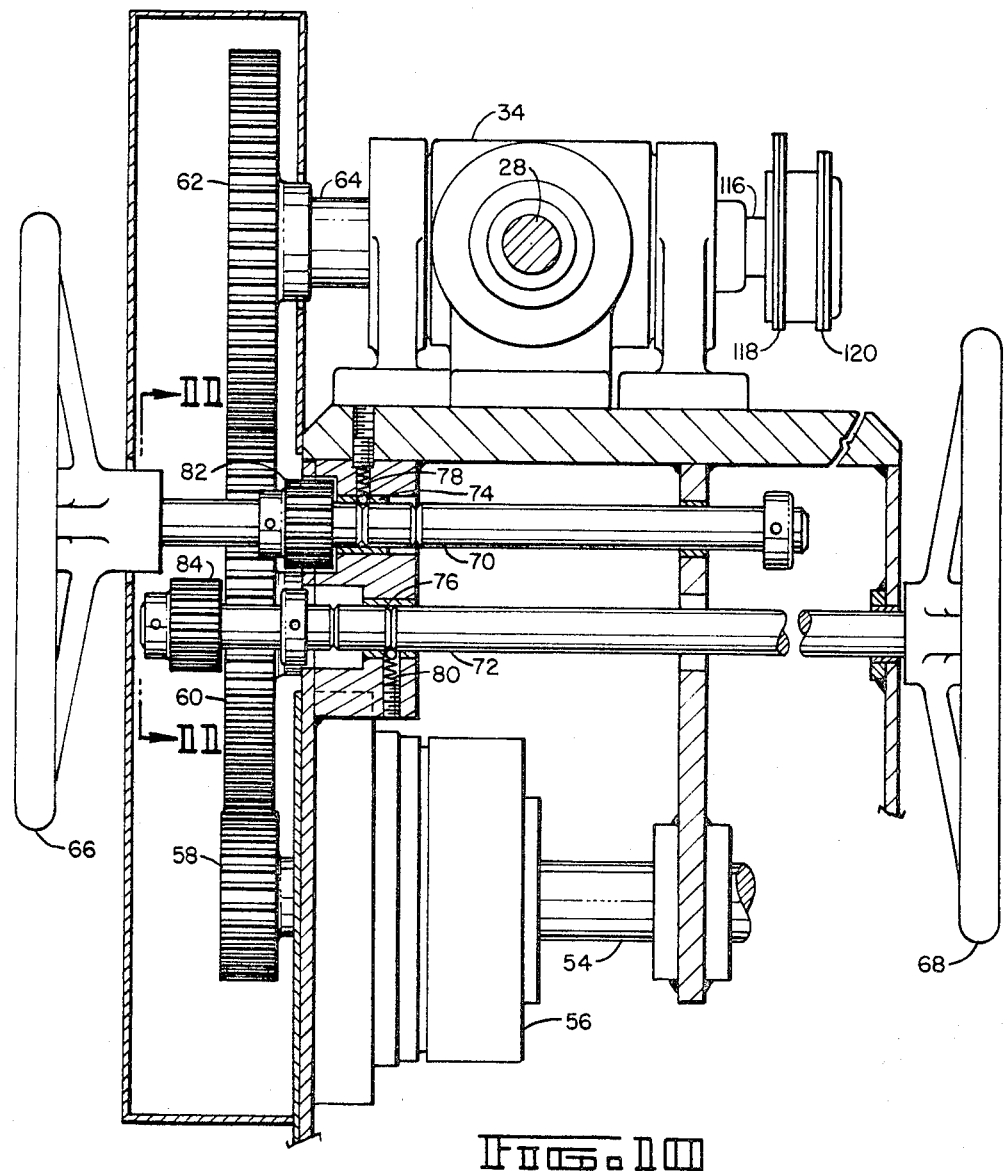
FIG. 10 is an enlarged fragmentary vertical sectional view taken generally as indicated at 10—10 in FIG. 2.

Still referirng to FIG. 10, it will be observed that left and right-hand hand wheels 66 and 68 are provided respectively on shafts 70 and 72. The shafts 70 and 72 are slidably mounted in bearings 74, 76 and have associated spring detent devices 78 and 80 adapted to releasably secure the shafts in operative and inoperative positions. In their operative position, the shafts 70 and 72 are moved axially to provide for the engagement of the gear 60 with gears 82 and 84 mounted respectively on the shafts. Thus, it will be apparent that the left-hand hand wheel 66 can be pulled toward the operator of the machine whereby to engage the gear 82 with the gear 60 and to provide for manual operation of the aforesaid cam shafts 28, 30, etc. Similarly, the hand wheel 68 can be pulled toward the operator of the machine to engage the gears 60 and 84 in a set-up operation of the winding machine.

Figure 11:
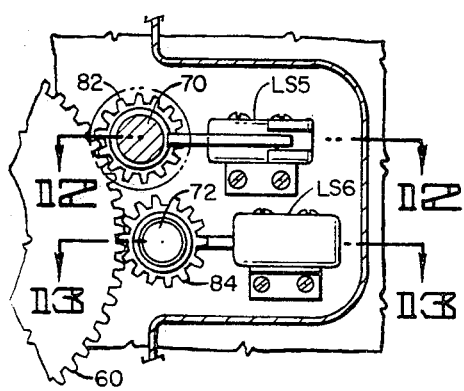
FIG. 11 is a fragmentary enlarged sectional view taken generally as indicated at 11—11 in FIG. 10.
Figure 12:
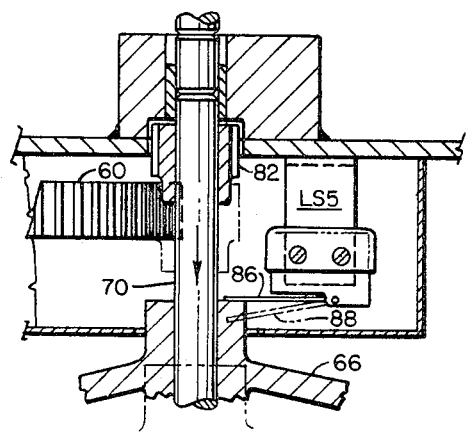
FIG. 12 is a fragmentary enlarged sectional view taken generally as indicated at 12—12 in FIG. 11.
Figure 15:
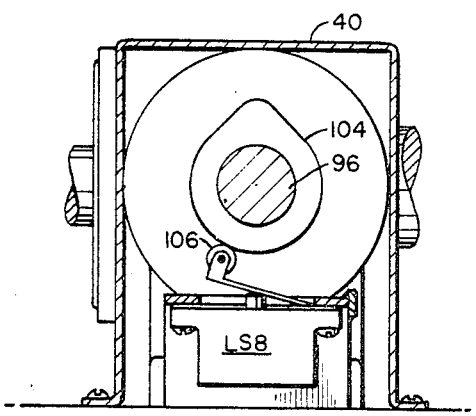
FIG. 15 is an enlarged fragmentary sectional view taken generally as indicated at 15—15 in FIG. 14.
Figure 13:
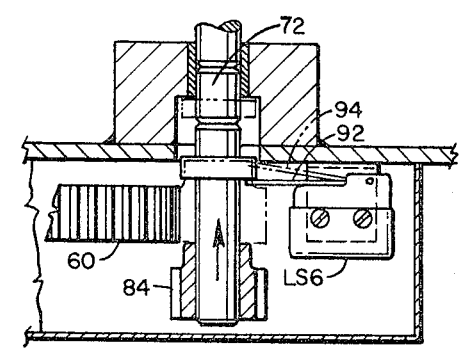
FIG. 13 is an enlarged sectional view taken generally as indicated at 13—13 in FIG. 11.
Figure 14:
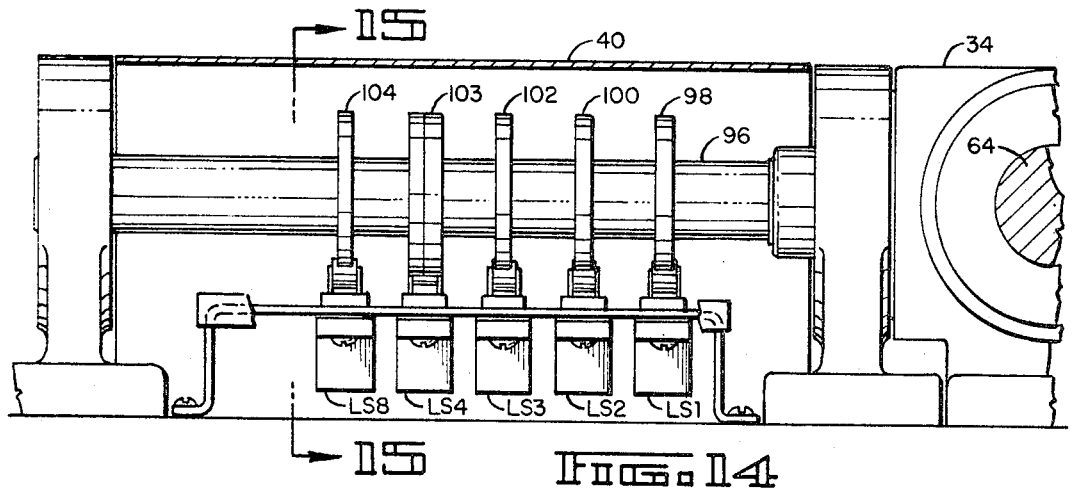
FIG. 14 is a fragmentary enlarged sectional view taken generally as indicated at 14—14 in FIG. 1.
Figure 22:
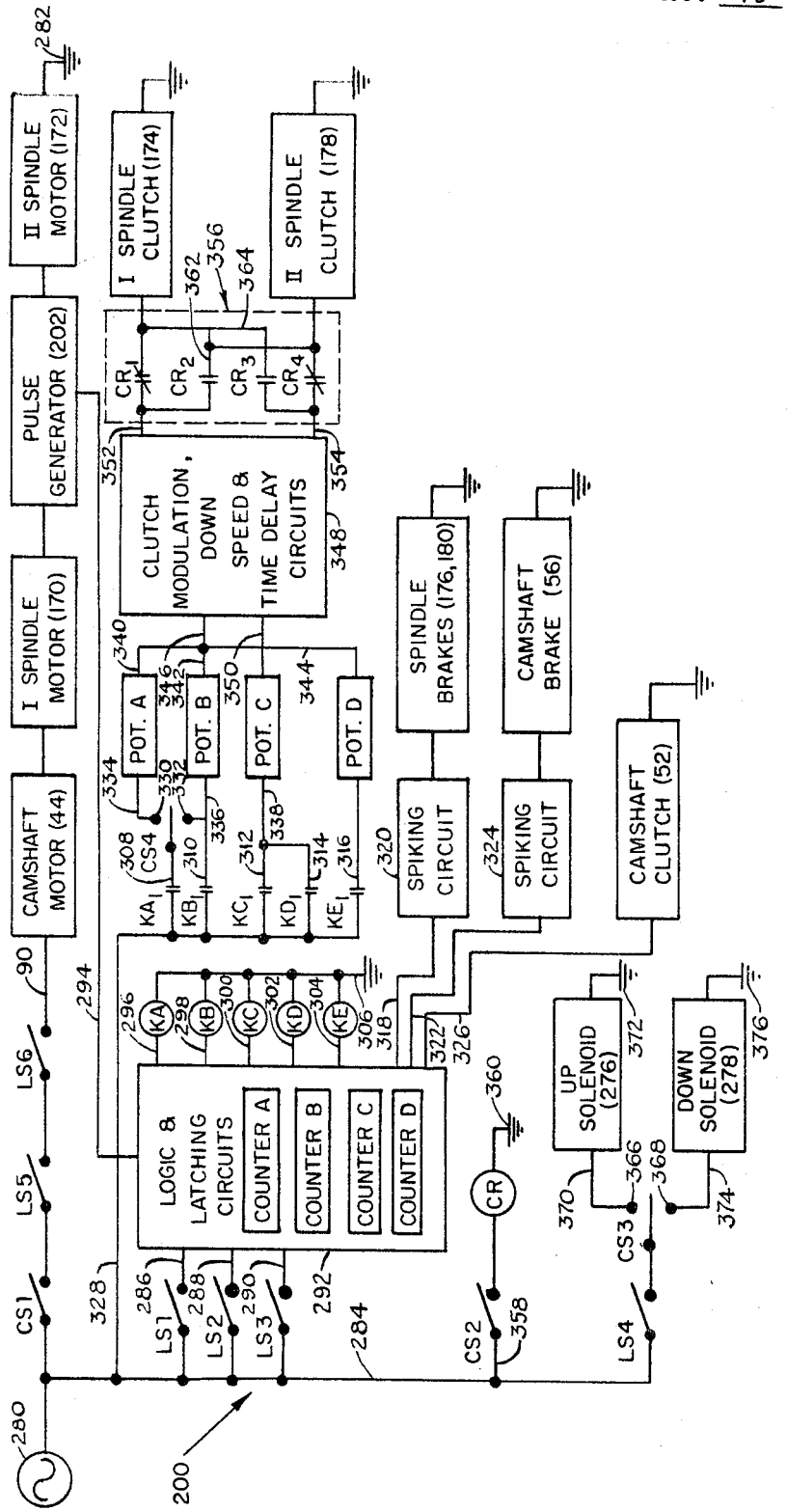
FIG. 22 is a schematic illustration of a control means for the spring winding machine.

Preferably, the hand wheels 66 and 68 are armed with safety devices adapted positively to prevent operation of the machine mechanisms when the operator of the machine moves a hand wheel to its operative position for set-up operation. Thus, the shafts 70 and 72 are shown in FIGS. 11 through 13 associated respectively with limit switches LS5 and LS6. The limit switches LS5 and LS6 are normally closed in an electrical power line to the camshaft motor 44 and are opened to terminate motor operation when the corresponding hand wheels 66, 68 are moved to operative positions. Thus, the shaft 70 in FIG. 12 is moved downwardly to engage the gear 82 with the aforementioned gear 60 to move the hand wheel to an operative position. Such movement of the hand wheel 66 accommodates movement of a switch element 86 from the full line position shown to the broken line position shown at 88. Such movement of the switch element results in opening of the switch LS5 in a power line 90, FIG. 22, to the camshaft motor 44. Similarly, the limit switch LS6 includes a switch element 92 having a broken line position 94. When the shaft 72 is moved to its operative position to engage the gear 84 with the gear 60, the switch element 92 is permitted to move from its full line position to the broken line position. Such movement results in opening of limit switch LS6 in power line 90, FIG. 22. Accordingly, operation of the motor 44 is terminated and possible injury to the operator of the machine by inadvertent mechanism movement is averted. Referring particularly to FIGS. 14 and 15, it will be apparent that the limit switch assembly 40 can be driven in timed relationship with the rotation of the aforementioned camshafts 28, 30 etc., by means of a shaft 96. The shaft 96 extends to the aforementioned housing 34 for driving connection with the shaft 64. Mounted on the shaft 96 are cam means 98, 100, 102, 103 and 104, associated respectively with limit switches LS1, LS2, LS3, LS4, and LS8. The limit switches LS1 through LS4 are operable in the control of the spring winding machine and as indicated in FIG. 22 and will be described more fully hereinbelow. Limit switch LS8 is a spare for possible future use. The limit switches LS1 through LS8 are operated by their respective cams and by small cam followers 106, 106, one shown, FIG. 15.

Figure 23:
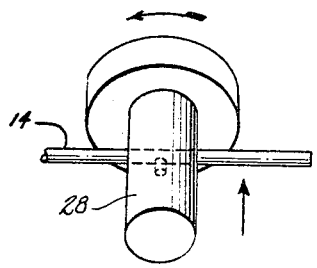
FIG. 23 is a schematic illustration showing spindle movement required in the formation of a left-hand conventional spring.
Figure 25:
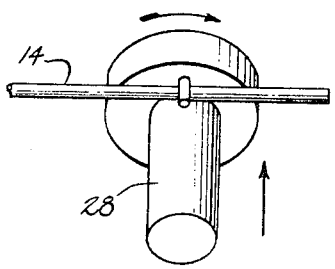
FIG. 25 is a schematic illustration showing spindle movement required in the formation of a right-hand conventional spring.
Figure 27:
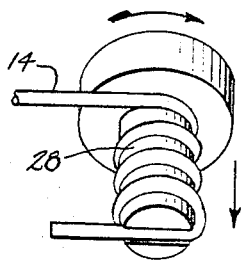
FIG. 27 is a schematic illustration of spindle movement required in the formation of an end across center spring.
Figure 29:
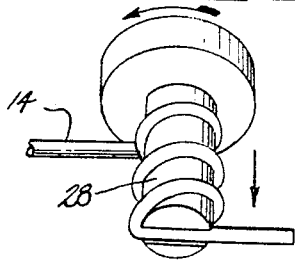
FIG. 29 is a schematic illustration showing spindle movement required in the formation of a right-hand end across center spring.

The wire feed mechanism is best illustrated in FIGS. 16 through 19 and includes a base 108 mounted on the tablelike top portion 12 of the winding machine. A slide 110 has a dovetail connection with the base at 112 so as to move longitudinally from left to right, FIG. 16, and toward and away from the spindle 28. In operation, the feed mechanism grips wire such as the wire 114 and pulls the same from the coil 14 through the straightener 20 to advance a leading end portion thereof to a position such as that shown in FIG. 23 adjacent the spindle 28. In such operation, the slide 110 moves from left to right and then returns to the left-hand position shown whereupon wire is allowed to move through the feed mechanism at the urging of the spindle during winding of the same about the spindle.

The aforementioned gear box 34 also includes a stub shaft 116 shown in FIG. 10 which drives first and second feed mechanism cams 118 and 120. The cam 118 effects reciprocating movement of the slide 110 in properly timed relationship with other machine mechanisms and the cam 120 operates a wire gripper mechanism carried by the slide 110. A follower for the cam 118 is best shown in FIGS. 17 and 19 at 122. The follower 122 is carried by a short arm 124 pivotally mounted upon a shaft 126 and connected with a link 128 so as to oscillate the latter as oscillatory movement is imparted to the follower 122 by the cam 118. The link 128 has adjustably connected thereto a link 130 which connects at an opposite end portion with a lever 132 pivotally supported at 134 and having one end of a link 136 connected thereto. An opposite end portion of the link 136 is pivotally connected by means of a short pivot pin 138 and a mounting bracket 140 to the slide 110. Thus, the slide 110 is reciprocated on its guide by means of the follower 122 and a mechanical advantage system comprising the several links and levers described. A return spring is provided for the slide 110 at 142.

The cam 120 has an associated follower 144 which is connected with a laterally swingable guideway 146. Parallel links 148 and 150, best shown in FIG. 16, are pivotally connected with the guideway 146 to permit the guideway to swing from the position shown inwardly toward the wire 114 and in the direction of wire feed movement. When the guideway 146 is so moved at the urging of the follower 144, a small slide 149 causes a swingable cam 151 to move pivotally about a pivot pin 152, the said cam being pivotally connected to the slide 149 at 154. The swingable cam 151 engages a small follower 156 carried by a wire gripping member 158 and effects pivotal movement of the said gripper member about a pivot 160. Thus, as the guideway 146 is swung inwardly and forwardly in the direction of wire feed movement, the slide 149 causes the cam member 151 to move slightly in a counterclockwise direction in FIG. 16. Such movement of the cam 151 causes the wire gripping member 158 to pivot about the pin 160 in a counterclockwise direction whereby to grip the wire at 162 for a feed operation on the wire. The wire gripping member 158 is urged out of gripping engagement with the wire by a return spring 164 and a return spring 166 biases the swingable guideway 146 to the position shown.

As will be apaprent from an examination of FIG. 23 through 29, rotation of the spindle 28 is required in one and an opposite direction for the formation of various types of springs and for recoil operation thereon and axial movement of the spindle is also required. That is, the spindle 28 is moved axially during the winding of a spring whereby to introduce pitch to the spring. As mentioned above, a spindle drive means is provided and, in accordance with the invention, the said drive means is engageable and disengageable independently of the operation of the aforementioned feed and auxiliary mechanisms. In its independent operation, the spindle drive means serves to start, stop, and to rotate the spindle 28 in one and an opposite direction, and the said means also serves to impart the required axial or pitch movement to the spindle.

Figure 9:
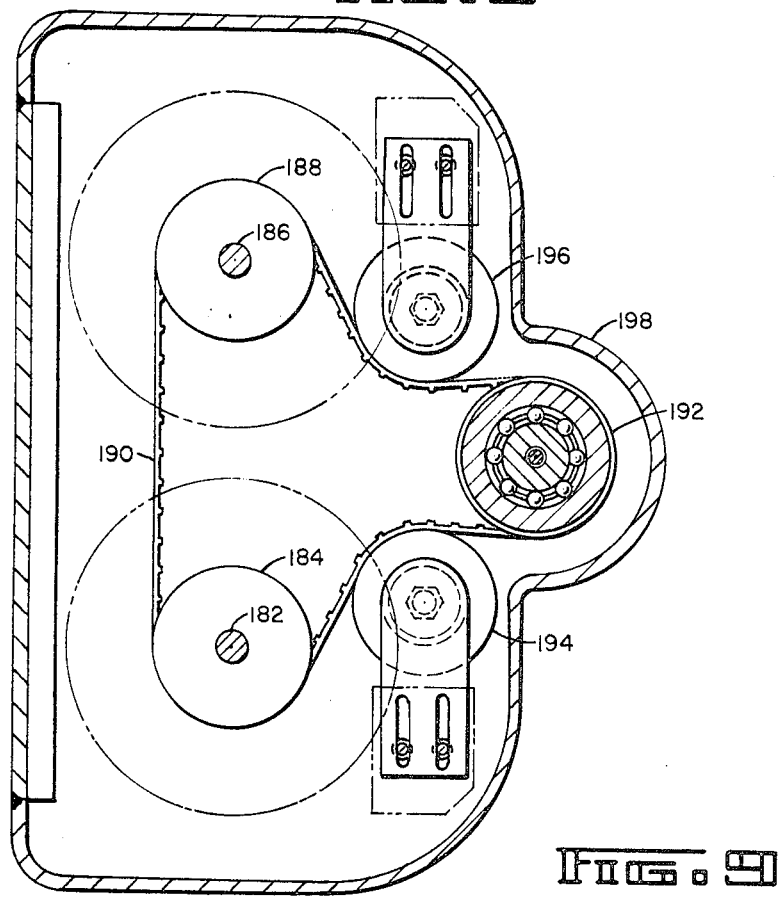
FIG. 9 is an enlarged horizontal sectional view taken generally as indicated at 9—9 in FIG. 4.

While the spindle drive means may vary widely in form, it is the presently preferred practice to provide electric motor means separate and independently from the aforementioned motor means 44 and also to provide electrically operable clutch and brake means in association with the motor means. More specifically, first and second oppositely rotatable electric motors 270 and 172 are provided and each of the motors has an electrically operable clutch and an electrically operable brake associated therewith. An electrically operable clutch 174 and an electrically operable brake 176 are shown in association with the motor 170 in FIG. 4. While the clutch and brake associated with the motor 172 are not shown in the mechanical drawings, they are illustrated schematically in FIG. 22 at 178 and 180, respectively. The brake 176 has an output shaft 182 which carries a cog pulley 184 and the brake 180 has an output shaft 186, FIG. 9, which carries a similar cog pulley 188. A cog belt 190 is engaged with the pulleys 184 and 188 and with a spindle drive pulley 192. Adjustable idler pulleys are provided at 194 and 196 and the pulley mechanism is enclosed within a housing 198, FIGS. 2, 3 and 9.

From the foregoing it will be apparent that the electrically operated clutches and brakes of the spindle drive means can be operated to effect start, stop, and rotational operation of the spindle drive pulley 192 in one and an opposite direction, the motors 170 and 172 being arranged for rotation in opposite directions. Such operation of the clutches and brakes is effected under the regulation of a control means 200 illustrated schematically in FIG. 22 and to be described more fully hereinbelow. The said control means includes as one element a spindle rotation responsive device which may vary widely in form but which is shown in the form of a pulse generator 202 connected so as to be driven by the cog pulley 184, FIG. 4.

Figure 4:
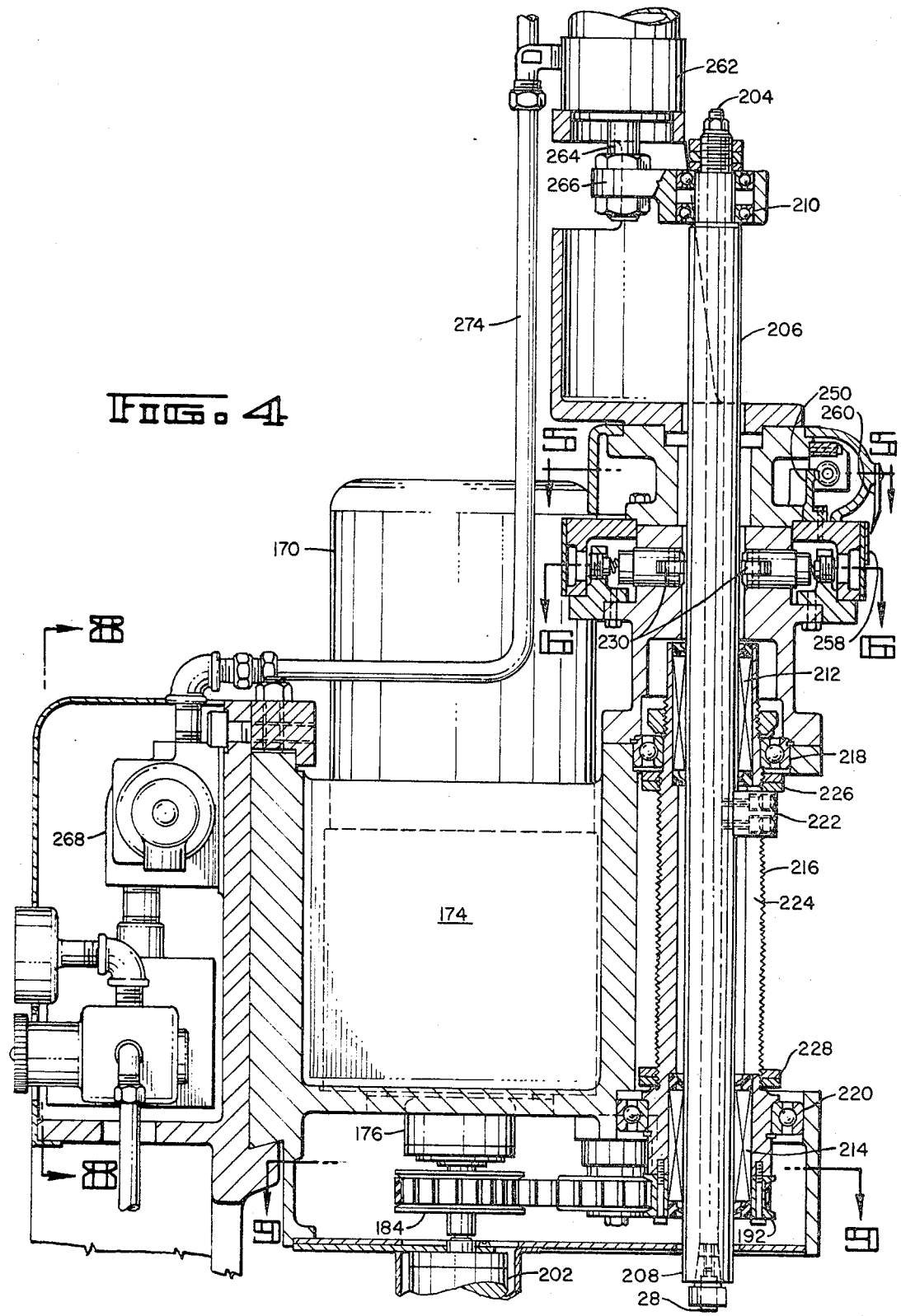
FIG. 4 is an enlarged sectional view taken generally as indicated at 4—4 in FIG. 3 and showing drive means for a spring winding spindle.

As best illustrated in FIG. 4, a draw bolt 204 extends downwardly within a sleeve 206 to a lower end portion where it serves to frictionally grip a spindle assembly at 208. The sleeve 206 is rotatably received within a bearing 210 at an upper end portion thereof and linear bearings 212 and 214 support the sleeve 206 for vertical sliding movement within a sleevelike rotatable drive cylinder 216. The drive cylinder 216 is rotatably supported by upper and lower bearing assemblies 218 and 220 and has the aforementioned drive pulley 192 connected at a lower end portion. A rotational drive connection between the cylinder 216 and the sleeve 206 is effected by means of a small connecting block 222 received in an appropriate vertical slot 224 in the cylinder 216. Block 222 is connected with the sleeve 206 so as to drive the same rotatably irrespective of the vertical position of the sleeve. That is, the sleeve is movable vertically or axially for required pitch movements of the spindle 28 while in driven connection with the cylinder 216. Upper and lower limits of sleeve 206 and spindle 28 movement can be adjusted by means of appropriate stop nuts 226 and 228 threadably mounted on the cylinder 216.

Figure 5:
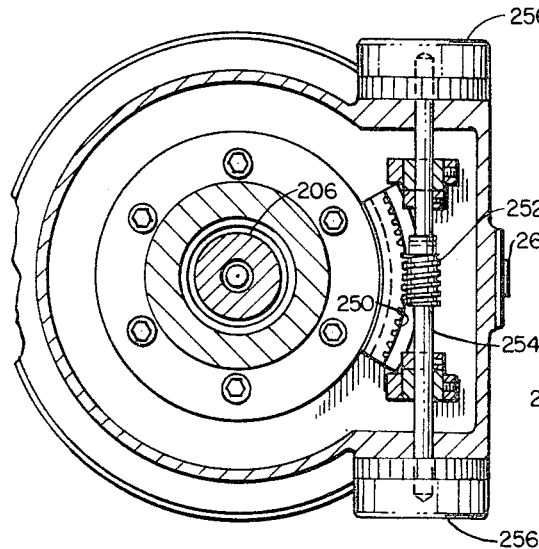
FIG. 5 is an enlarged horizontal sectional view taken generally as indicated at 5—5 in FIG. 4.
Figure 6:
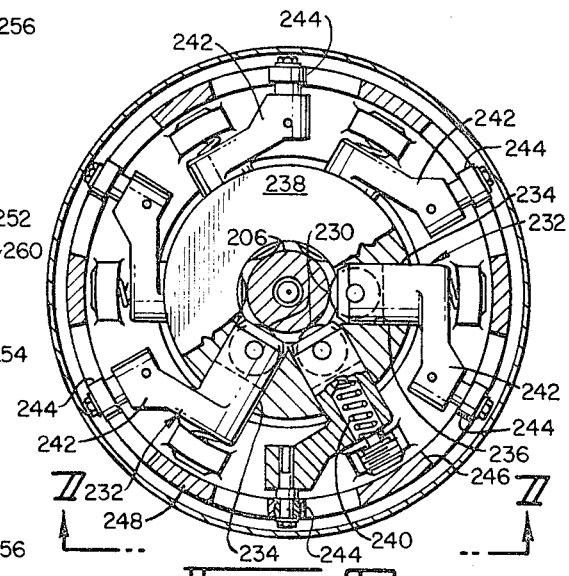
FIG. 6 is an enlarged sectional view taken generally as indicated at 6—6 in FIG. 4.
Figure 7:
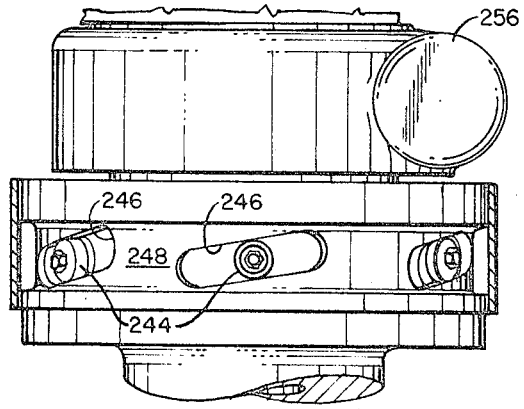
FIG. 7 is an enlarged side elevational view taken generally as indicated at 7—7 in FIG. 6.

In accordance with another aspect of the present invention, an axial drive means for the winding spindle is provided and comprises at least one small roller frictionally engaged with the spindle or spindle sleeve 206 and rotatable about an axis inclined from axial and radial planes whereby to provide a component of axial force on the spindle or its sleeve and to thereby effect axial spindle pitch movement when the spindle is rotated. In the presently preferred form, a plurality of small rollers are provided and the rollers are urged into frictional engagement with the spindle sleeve 206 by suitable spring means. As best illustrated in FIGS. 4 and 6, six (6) rollers 230, 230 are engaged with the sleeve 206 and each roller has an associated support member 232 with a cylindrical inner portion 234 rotatably received in a suitable cylindrical recess 236 in a stationary support block 238. A spring 240 for each roller 230 urges the roller inwardly into engagement with the sleeve 206. An outer portion or arm 242 on each of the elements 232 carries a small roller 244 which operates in the nature of a cam follower in an associated slot 246. The slots 246, 246 are inclined between vertical and horizontal planes in a member 248 which is generally cylindrical in form and which is rotatable at least through an angle sufficient to provide for movement of the slots translating the followers from one end portion of the slots to the opposite end portion thereof. As will be apparent, rotational movement of the member 248 will result in a camming action of the slot walls on the followers 244 and in generally vertical swinging movement of the followers. Thus, the followers 244 can be moved generally upwardly and downwardly and through action of the associated arms 242 the inner cylindrical portions 234 of the elements 232 can be rotated whereby to adjust the axes of the several rollers 230, 230 in unison. A means for rotating the member 248 whereby to adjust the axes of the rollers 230, 230 takes the form of a ring gear 250, best illustrated in FIGS. 4 and 5. The ring gear 250 meshes with and is driven by a small worm gear 252 mounted on a shaft 254 and which carries at opposite end portions manually operable dial members 256, 256. Dial members 256, 256 form a part of an indicator means which also comprises a scale 258 and an indicator member 260, FIGS. 3, 4 and 5. The indicator member 260 is maintained in a fixed position while the scale 258 is mounted for movement with the aforementioned member 248. As will be apparent, the scale 258 can be graduated to indicate desired pitch settings and movement thereof in one and an opposite direction will indicate, respectively, left and right-hand pitch settings.

Figure 24:
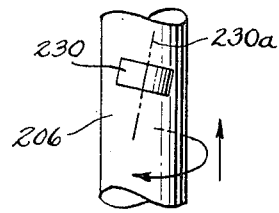
FIG. 24 is a schematic illustration showing pitch control setting required in the operation illustrated in FIG. 23.
Figure 26:
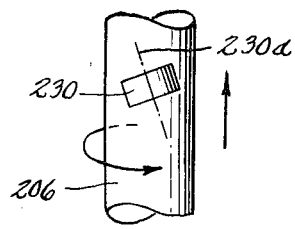
FIG. 26 is a schematic illustration of pitch control setting required in the FIG. 25 operation.
Figure 28:
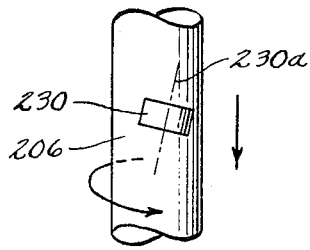
FIG. 28 is a schematic illustration of pitch control setting for the operation of FIG. 27.
Figure 30:
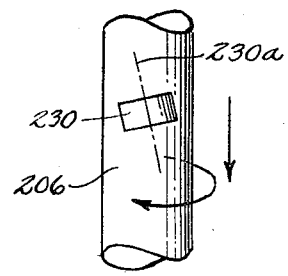
FIG. 30 is a schematic illustration showing the pitch control setting required for the operation of FIG. 29.

For a full understanding of the manner in which the rollers 230, 230 are adjusted to provide for desired pitch movements of the spindle sleeve 206 and the spindle 208, reference may be had to FIGS. 23 through 30. As a first example, the formation of a left-hand conventional spring may be considered. In the formation of such a spring it is necessary to rotate a spindle 28 in a counterclockwise direction viewed from the bottom and an upward movement of the spindle is required for pitching the spring. Referring to FIG. 24, it will be apparent that a spindle sleeve 206 will move upwardly when rotated in a counterclockwise direction viewed from the bottom and when the rollers 230, 230 are adjusted so that their axes are inclined rightwardly from the vertical at upper portions thereof. Similarly, a right-hand conventional spring requires clockwise spindle rotation viewed from the bottom and upward pitch movement of the spindle. Such operation is achieved when the rollers 230, 230 have their axes 230a, 230a inclined rightwardly from the vertical at upper end portions. When a left-hand cross center spring is required, clockwise spindle rotation and downward pitch movement is called for. Inclination of roller axes 230a, 230a rightwardly from the vertical at upward end portions result in an axial component of force on the spindle sleeve 206 urging the same downwardly when the sleeve is rotated in a clockwise direction, FIG. 28. Finally, a right-hand cross center spring, FIG. 29, requires counterclockwise spindle movement and downward pitch movement of the spindle. Inclination of the roller axes 230a, 230a to the left at upper end portions results in the desired sleeve and spindle movement when the said elements are rotated in a counterclockwise direction. As will be apparent, the amount or degree of inclination of the axes 230a, 230a will determine the amount or degree of pitch movement of the sleeve and spindle for each convolution of the spring.

It will be further apparent that return of the spindle to a vertical "start position" is required when a spring has been completed and removed from the spindle and when it is desired to commence formation of a subsequent spring. With the axial drive mechanism described above, return movement of the sleeve 206 and the spindle 28 can be conveniently provided for merely by forceably sliding the spindle sleeve 206 upwardly or downwardly as required past the rollers 230, 230. In the presently preferred form, return means comprises a fluid cylinder 262 having a rod 264 connected with a bracket 266 which carries the aforementioned bearing 210 at the upper end portion of the sleeve 206. As will be apparent, the fluid cylinder 262 can be operated under the regulation of control means to forceably urge the sleeve 206 to a "start position."

Figure 8:
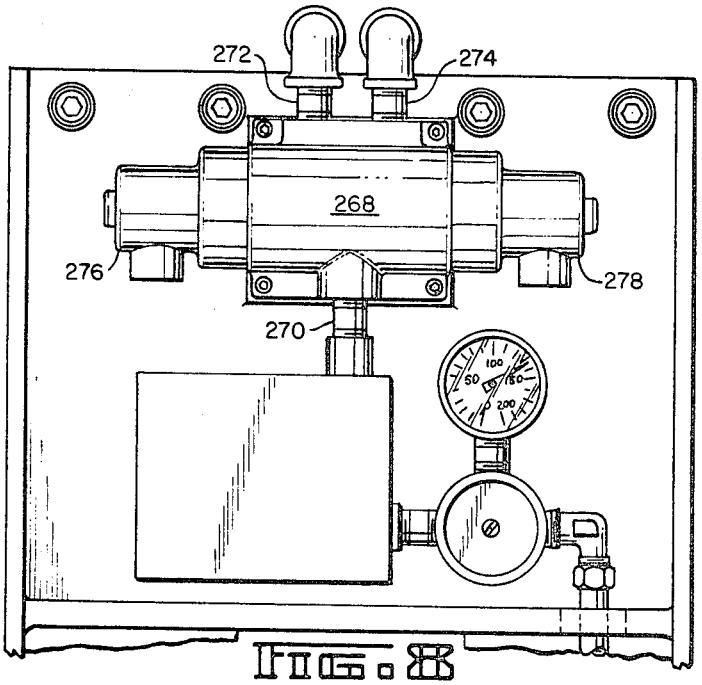
FIG. 8 is an enlarged rear fragmentary rear view showing control means for a fluid cylinder in the spindle drive means.

A control valve 268 for the cylinder 262 is best illustrated in FIGS. 4 and 8 and is provided with the necessary supply conduit 270 and control conduits 272 and 274 extending to the cylinder 262. "Up" and "down" solenoids 276 and 278 control the operation of the valve 268 whereby to provide for movement of the spindle sleeve 206 and spindle 28 in the desired direction in return to a "start position." Control means for operating the "up" and "down" solenoids will be described hereinbelow.

The control means 200 mentioned above is illustrated schematically in FIG. 22 and comprises the aforementioned power line 90 connected with a source of electrical power 280. The control line 90 contains control switch CS1 which may be manually operable for over-all control of machine operation. The aforementioned limit switches LS5 and LS6 associated with the manually operable hand wheels 66 and 68 are also shown disposed in the power line 90 and the said line extends to the camshaft motor 44, the first spindle motor 170, the pulse generator 202, the second spindle motor 172, and finally to ground at 282. Thus, opening of either of the switches LS5 and LS6 results in de-energization of the elements mentioned and shut-off operation of the spring winding machine. A branch conductor 284 connected with the line 90 has branch conductors 286, 288 and 290 connected thereto and extending therefrom to a control unit 292. The lines 286, 288 and 290 respectively have disposed therein the aforementioned limit switches LS1, LS2 and LS3. The control unit 292 includes logic and latching circuits which may be conventional in form and need not be described here for a full understanding of the invention. Similarly, counter means is included in the control unit 292 and may take conventional form. Preferably, four (4) counters A, B, C and D are provided and each of the said counters is adapted to be preset so as to act in a specified manner on attainment of a preselected number of counts. Counters A and B may be regarded as controlling the forward or wind portion of spindle rotation and counters C and D regulate the reverse or recoil rotation of the spindle. In addition to the preset signal introduced to the counters A, B, C and D in a conventional manner, a signal representing the extent of spindle rotation is introduced from the pulse generator 202. A line 294 is shown connecting the said generator with the control unit 292 and in the preferred form, the pulse generator 202 is adapted to provide first and second pulse trains. The first pulse train comprises a single pulse per revolution of the spnidle and is introduced in the control unit 292 to the first forward or wind counter A. The second pulse train comprises a multiple of pulses per spindle revolution, one hundred twenty (120) such pulses in the presently preferred embodiment, and the said pulse train is introduced to coutner B, C and D in the control unit 292.

Output lines from the control unit 292 comprise the conductors 296, 298, 300, 302 and 304 extending to ground at 306. The said lines respectively include relays KA, KB, KC, KD and KE having contacts KA1, KB1, KC1, KD1 and KE1 disposed respectively in the conductors 308, 310, 312, 314 and 316. Additionally, an output line 318 from the control unit 292 extends to a spiking circuit 320 and to the aforementioned spindle brakes 176 and 180. Output line 322 extends to a similar spiking circuit 324 and to the aforementioned camshaft brake 56. Output 326 extends from the control unit 292 to the camshaft clutch 52. Spiking circuits 320 and 324 left off provide for an initial high magnitude voltage signal to the spindle and camshaft brakes whereby to provide a desired high response rate of the latter.

A supply line 328 from the aforementioned conductor 284 extends to the conductors 308, 310, 312, 314 and 316 and the said lines in turn extend to a plurality of signal transmitting devices comprising potentiometers A, B, C and D. More specifically, the line 308 extends to control switch CS4 which is alternately engageable with contacts 330 and 332. Contact 330 is disposed in a line 334 which extends to potentiometer A whereas the contact 332 is disposed in a line 336 extending to potentiometer B. The line 310, including the contacts KB1, also extends to the line 336 and thence to the potentiometer B. The lines 312 and 314 extend to a line 338 which extends in common to the potentiometer C and the line 316 extends to the potentiometer D. Potentiometers A, B and D have output lines 340, 342 and 344 extending to a common line 346 and thence to a control unit 348. Line 350 from the potentiometer C also extends to the control unit 348. Control unit 348 comprises conventional circuitry employed to regulate the characteristics of control signals applied through the lines 346 and 350 to the spindle clutches 174 and 178 connected to the unit by the lines 352 and 354. Desired response curves for the clutches are provided and, in addition, a time delay is provided for operation in a manner to be set forth below.

Disposed between the control unit 348 and the spindle clutches 174 and 178 is a reversing circuit 356 operated by means of a control switch CS2 and a relay CR disposed in a line 358 connected with the aforesaid line 284 and extending to ground at 360. The reversing circuit 356 includes contacts CR1, CR2, CR3 and CR4 operable alternately by the relay CR. The contact CR1 is disposed in the line 352, the contact CR4 is disposed in the line 354, and the contacts CR2 and CR3 are disposed respectively in the cross lines 362 and 364. Thus, with the control switch CS2 in the open position as shown, contacts CR1 and CR4 are in a closed condition while contacts CR2 and CR3 are in an open condition. Clutch control signals emanating from the control unit 348 by the lines 352 and 354 are directed through said lines to the clutches 174 and 178, respectively. With the control switch CS2 in a closed position whereby to maintain relay CR in an opposite condition, the contacts CR1 and CR4 are maintained in an open condition and the contacts CR2 and CR3 are closed. Thus, signals emanating from the control unit 348 respectively in the lines 352 and 354 are directed through the lines 362, the contacts CR2, and to the spindle clutch 178, and through the line 364 and the contact CR3 to the spindle clutch 174. As will be apparent, the control switch CS2 is moved to one or the other position in a set-up operation to determine the direction of spindle rotation in accordance with the desired spring formation.

The aforementioned limit switch LS4 is disposed in the line 284 and the said line extends to a control switch CS3. The control switch CS3 may be manually operable and is selectively engageable with contacts 366 and 368. The contact 366 is disposed in a line 370 extending to the aforementioned up solenoid 276 grounded locally at 372. The contact 368 is disposed in a line 374 which extends to the down solenoid 278 locally grounded at 376. As will be apparent, the control switch CS3 can be moved into engagement with contact 366 when it is desired that the spindle 28 be returned upwardly to a start position, i.e., when the spindle moves downwardly in its pitch introducing movement. Conversely, when the spindle moves upwardly in a pitch introducing movement, it is necessary to return the same downwardly and the control switch CS3 is moved into engagement in a set-up operation with the contact 368. Subsequent closing of the limit switch LS4 results in energization of the down solenoid 278 and in return movement of the spindle 28 downwardly to its start position for the formation of a subsequent spring.

The cyclic operation of the spring winding machine will be readily understood and the machine's versatility appreciated with particular reference to the diagrams of FIGS. 20 and 21 and the control schematic of FIG. 22. When the machine has been set up as desired with the control switches CS2 and CS3, cyclic operation can be initiated and a feed operation of the feed mechanism 26 will commence with the camshaft clutch 52 energized and the camshaft brake 56 de-energized. Limited front end forming may also be accomplished with one of the aforementioned auxiliary forming mechanisms driven by a camshaft such as 28, 30, etc. At the completion of feed or feed and forming, as the case may be, limit switch LS1 is moved to a closed position and the winding operation commences. Closing of limit switch LS1 also serves to energize the camshaft brake 56 and to de-energize the camshaft clutch 52 whereupon the camshaft is stopped as indicated in FIG. 20 throughout the winding operation.

During the winding operation, precise control is exercised and a high degree of accuracy is achieved despite the high speed operation attained. When a relatively long spring is to be produced, winding commences at a relatively low speed, then continues at a high speed, and is completed at a relatively low speed in the manner indicated by the diagram of FIG. 20. The aforementioned potentiometers A and B are preset, respectively, to provide the desired high speed or "high forward" condition and the low speed or "low forward" condition. That is, the setting of the potentiometers determines the magnitude of the voltage signal which proceeds from the potentiometers to the control unit 348, the reversing circuitry 356 and the elected spindle clutch 174 or 178. At commencement of winding, the counter operates the relay KA to close the relay contacts KA1 and thereby to pass a voltage signal to the control switch CS4. The control switch CS4 resides in engagement with the contact 330 when combined high and low speed winding operation is desired and the potentiometer A thus passes the high speed winding signal to the control unit 348, the reversing circuit 356 and the elected spindle clutch 174 or 178 (assume the first spindle clutch 174). The potentiometer A has been preset to pass a voltage signal of relatively high magnitude causing the clutch 174 to engage tightly and to provide a high forward speed as indicated in the diagram after termination of a preset time delay. The preset time delay is provided by conventional circuitry in the control unit 348 as mentioned above. When the desired number of turns has been completed as preset for the counter A, a low speed terminal winding portion is desired. Thus, relay KB is operated by counter B and closes the contact KB1 while the contacts KA1 are opened. The voltage signal to the clutch now passes through the potentiometer B which has been preset to provide a substantially lower magnitude of voltage for clutch operation. Thus, clutch engagement will not be as "tight" as in the high speed operation and the speed will drop off as indicated to a low speed terminal winding condition. The characteristic of the curve during both the initial and terminal portions of the winding operation are determined by the control unit 348 including the clutch modulation, down speed and time delay circuits.

When counter B has "counted out" and the desired number of turns and/or partial turns have been completed in the winding operation, rotation of the spindle is terminated by opening of the contact KB1 and the clutch camshaft 52 is energized while the brake 56 is de-energized to commence rotation of the camshafts 28, 30, etc.

After the completion of winding, recoil operation is desired as mentioned above and, in accordance with the present invention, a precisely controlled recoil operation is obtainable in the winding machine. Limit switch LS2 is set to commence recoil and when its associated cam causes it to close, counter D assume control and operates relay KD whereby to close contacts KD1 and to pass a voltage signal to the potentiometer C, to the control unit 348, the reversing circuit 356, and the second spindle clutch 178. Spindle brakes 176 and 180 having been energized at the end of the winding operation, are de-energized and the clutch 178 operates to reversely rotate the spindle 28 and to thereby provide the desired recoil operation. When counter D is satisfied, the relay KD is operated to open the contacts KD1 whereby to terminate the operation of the clutch 178 and to cause the spindle brakes to re-energize. Further forming operation and cut-off thereupon occurs on the end portions of the spring as carried out by the various auxiliary mechanisms mentioned above. At the end of forming and cut-off, limit switch LS3 is closed whereupon relay KE closes contacts KE1 and sends a signal through potentiometer D, the control unit 348, and the reversing circuit 356 to spindle clutch 174 to cause the spindle to turn to a start position, such rotation terminating when the first pulse is received in the control unit 292 in the aforementioned single pulse per revolution train. Finally, limit switch LS4 closes as indicated whereupon to energize the up or down solenoid as preselected and to cause the fluid cylinder 262 to operate and to return the spindle axially to a start position.

In a second mode of operation indicated on the diagram of FIG. 20 and of particular utility when short springs are to be produced, a single slow speed winding operation is selected. In this mode of operation, the control switch CS4 is moved into engagement with the contact 332. Thus, both counter A and counter B operating through relays KA, KB and through contacts KA1 and KB1 transmit voltage signals through the low speed potentiometer B. The broken line in the winding portion of the diagram illustrates the single low speed winding operation.

In the diagram of FIG. 21, it will be observed that the machine operation can be identical with that described for the diagram of FIG. 20 from commencement of a cycle through the winding operation. At the completion of the winding operation, a partial recoil is provided for the purpose of positioning the front tail portion of a spring accurately for subsequent front tail forming. That is, it may be desired to turn the tail through a limited number of degrees to facilitate and to provide for more precise forming by the auxiliary forming mechanism mentioned above. Such partial recoil can be readily provided for by means of the counter C, the relay KC and its contact KC1. On operation of the relay KC by the counter C and closing of the contact KC1, a voltage signal will be transmitted through the potentiometer C and to the spindle clutch 178 until the said counter is satisfied. When the counter is satisfied the relay will be operated to open the contacts KC1 and to terminate the partial recoil. On completion of the partial recoil, camshaft rotation is initiated and front tail forming is carried out on the tail by the aforementioned auxiliary forming mechanism. At completion of front tail forming, limit switch LS2 is closed to initiate the final recoil which is carried out under the control of counter D in the manner described above. On completion of final recoil, rear tail cut-off and forming is accomplished as described above followed by spindle index and a return movement of the spindle to its axial start position.

In the diagram of FIG. 21, it is also possible to provide for a slow speed winding operation particularly well suited to short springs. In order to provide such operation, the control CS4 is positioned as indicated above for FIG. 20.

The invention claimed is:

1. The combination in a spring winding machine comprising a wire feed mechanism operable intermittently to grip and advance wire horizontally toward a work station and thereafter to accommodate free wire movement therethrough, a vertically extending winding spindle supported at said work station and adapted to engage a leading end of advanced wire and to thereafter draw the wire through said feed mechanism, said spindle being adapted further for rotation in one and an opposite direction and for axial movement respectively for winding and recoiling of wire about the spindle and for the introduction of pitch during winding, a plurality of interconnected horizontal cam shafts arranged in spaced relationship with said work station and carrying cam means adapted to operate auxiliary mechanisms adjacent said work station, power means for operating said feed mechanism and for rotating said cam shafts, and independent power means for said spindle, said independent power means comprising a fast response spindle drive means engageable and disengageable independently of feed mechanism and camshaft operation whereby selectively to start, stop and to effect axial movement and driven rotation of said spindle in each of said one and opposite directions for positive winding and positive recoil operation.

2. The combination in a spring winding machine as set forth in claim 1 including a control means connected with said spindle drive means and comprising a spindle rotation responsive device, said means being operable to control said spindle drive means and thereby regulate said driven spindle rotation in said one and opposite directions in response to signals received from said spindle rotation responsive device.

3. The combination in a spring winding machine as set forth in claim 2 wherein said control means includes presetable counter means for registering the extent of spindle rotation as indicated by said spindle rotation responsive device and for controlling said spindle drive means.

4. The combination in a spring winding machine as set forth in claim 3 wherein said counter means includes means for controlling the extent of rotation of said spindle in said one direction for winding a spring and the extent of driven spindle rotation in said opposite direction for the desired degree of recoil of a wound spring.

5. The combination in a spring winding machine as set forth in claim 4 wherein a means is provided for varying the speed of rotation of said spindle drive means and spindle between high and low levels during rotation of the spindle in said one direction for spring winding, and wherein said counter means includes means for controlling the extent of spindle rotation during winding for a first period of high speed winding and a second period of low speed winding.

6. The combination in a spring winding machine as set forth in claim 5 and including time delay means connected with said spindle drive means and operable at an initial portion of said first period of winding to gradually increase spindle speed from a low level to said high level.

7. The combination in a spring winding machine as set forth in claim 5 wherein said counter means includes means for controlling the extent of spindle rotation in said opposite direction during a first period of recoil of a wound spring and for controlling the extent of spindle rotation during a second and discrete period of spindle rotation during recoil.

8. The combination in a spring winding machine as set forth in claim 7 wherein said counter means comprises first and second presetable independent counters respectively for controlling the extent of spindle rotation for said first and second periods of winding, and wherein said counter means comprises third and fourth presetable independent counters respectively for controlling the extent of spindle rotation during said first and second periods of recoil.

9. The combination in a spring winding machine as set forth in claim 8 wherein said spindle rotation responsive device comprises a pulse generator operable to provide first and second pulse trains respectively comprising one and a multiple of pulses per spindle revolution, said generator and counters being so connected that said first counter receives and responds to said first pulse train and said second, third and fourth counters receive and respond to said second pulse train.

10. The combination in a spring winding machine as set forth in claim 8 wherein said spindle drive means comprises at least one electrically operable clutch means adapted to rotate said spindle at a speed variable with the magnitude of an electrical signal supplied to the clutch whereby to provide said high and low speed levels, wherein said control means comprises first and second adjustable signal transmitting means adapted respectively to transmit high and low speed signals to said clutch, and wherein said first and second counters transmit respectively and sequentially through said first and second signal transmitting means to provide high and low speed winding as aforesaid.

11. The combination in a spring winding machine as set forth in claim 10 wherein a control switch is provided between said first and second counters and said first and second signal transmitting means and is movable to one position for operation as aforesaid and to another position where all signals from said first and second counters are transmitted to said second signal transmitting device for low speed spindle rotation throughout the winding operation.

12. The combination in a spring winding machine as set forth in claim 10 wherein said clutch means comprises first and second oppositely rotatable electrically operable clutches, and wherein a controllable reversing circuit is connected between said counters and clutches, said circuit having first and second conditions wherein said wind and recoil counters are respectively reversed in connection to the clutches to provide for opposite hand springs.

13. The combination in a spring winding machine as set forth in claim 12 wherein said spindle drive means also includes fast response electrically operable brake means associated with said clutches and operable under the regulation of said control means to halt rotation of said spindle between winding and recoil operation thereof.

14. The combination in a spring winding machine as set forth in claim 13 wherein said brake means comprises first and second electrically operable brakes associated respectively with said first and second clutches, and wherein said spindle drive means also comprises first and second oppositely rotatable electric motors associated respectively with said first and second clutches.

15. The combination in a spring winding machine as set forth in claim 14 wherein said control means includes spiking circuitry for providing an initial high magnitude voltage of relatively short duration to said brakes whereby to provide a high rate of response for the brakes.

16. The combination in a spring winding machine as set forth in claim 1 wherein said spindle drive means comprises at least one small axial drive roller frictionally engaged with the spindle and rotatable about an axis inclined from axial and radial planes whereby to provide a component of axial force on said spindle and to thereby effect axial spindle pitch movement when the spindle is rotated.

17. The combination in a spring winding machine as set forth in claim 16 wherein means is provided for adjusting the position of said roller axis of rotation to vary the component of axial force on the spindle and thereby adjust the degree of pitch movement and to provide for pitch movement in opposite axial directions as required for opposite hand springs.

18. The combination in a spring winding machine as set forth in claim 17 wherein said spindle drive means also includes spindle return means operable on completion of a spring to move said spindle to a start position, said means being operable to overcome the frictional force exerted on said spindle by the aforesaid roller and to forceably move the spindle against such roller effect.

19. The combination in a spring winding machine as set forth in claim 18 wherein said spindle return means comprises a selectively operable fluid cylinder and control means therefor.

20. The combination in a spring winding machine as set forth in claim 2 wherein said power operating means for said feed mechanism and camshafts includes an electrically operable clutch and brake means, said control means serving temporarily to terminate camshaft rotation through operation of said clutch and brake means during spindle rotation in said one direction for spring winding operation.

21. The combination in a spring winding machine as set forth in claim 2 wherein said spindle drive means comprises first and second oppositely rotatable electrically operable clutches.

22. The combination in a spring winding machine as set forth in claim 21 wherein said spindle drive means comprises first and second oppositely rotatable electric motors drivingly connected respectively with said first and second clutches, wherein said brake means comprises first and second electrically operable brakes associated respectively with said first and second clutches, and wherein a belt-pulley drive connection is provided between said brakes and spindle.

23. The combination in a spring winding machine as set forth in claim 16 wherein a plurality of similar axial drive rollers are provided, and wherein a means is provided for adjusting the position of the roller axes in unison to vary the component of axial force on the spindle and thereby adjust the degree of pitch movement and to provide for pitch movement in opposite axial directions as required for opposite hand springs.

24. The combination in a spring winding machine as set forth in claim 23 and including an indicator means connected with said roller adjusting means and adapted to indicate pitch setting in accordance with roller axis position.

References Cited

UNITED STATES PATENTS

| | | | |
|---|---|---|---|
| 2,283,393 | 5/1942 | Simons | 242—25 |
| 2,697,470 | 12/1954 | Sampatacos et al. | 72—142 X |
| 2,792,869 | 5/1957 | Halvorsen | 72—142 X |
| 2,794,477 | 6/1957 | Sjobohm | 72—142 |
| 2,806,507 | 9/1957 | Stofko | 72—142 |

MILTON S. MEHR, *Primary Examiner.*

U.S. Cl. X.R.

72—143; 323—94; 324—63; 338—201